(12) United States Patent
Newberry et al.

(10) Patent No.: US 6,793,299 B2
(45) Date of Patent: Sep. 21, 2004

(54) STORAGE UNIT

(75) Inventors: David W. Newberry, Marion, OH (US); Klaus Fromme, Milwaukee, WI (US); Mark A. Thielke, Menomonee Falls, WI (US); James R. Heimler, Oak Creek, WI (US); Richard A. Goodare, Franklin, WI (US); Bryan H. Mullett, Hartland, WI (US); Carolyn E. Johnson, Menomonee Falls, WI (US); Thomas E. Pelt, Menomonee Falls, WI (US); Larry K. Stover, Hartland, WI (US)

(73) Assignee: The Mills Company, Inc., Sandusky, OH (US)

( * ) Notice: Subject to any disclaimer, the term of this patent is extended or adjusted under 35 U.S.C. 154(b) by 58 days.

(21) Appl. No.: 10/096,773

(22) Filed: Mar. 13, 2002

(65) Prior Publication Data

US 2002/0130597 A1 Sep. 19, 2002

Related U.S. Application Data

(60) Provisional application No. 60/275,411, filed on Mar. 13, 2001.

(51) Int. Cl.$^7$ .......................... A47B 17/00; A47B 19/00; A47B 27/00; A47B 41/00

(52) U.S. Cl. .................... 312/199; 312/332.1; 312/333; 312/334.1; 312/326

(58) Field of Search ................................ 312/199, 201, 312/202, 217, 220, 216, 326, 332.1, 333, 334.1, 138.1

(56) References Cited

U.S. PATENT DOCUMENTS

| | | | |
|---|---|---|---|
| 449,936 A | 4/1891 | Jackson | |
| 498,178 A | 5/1893 | Leonard | |
| 537,844 A | 4/1895 | Moore et al. | |
| 669,171 A | 3/1901 | Jefferis | |
| 726,555 A | 4/1903 | Mayer | |
| 810,415 A | 1/1906 | Jefferis | |
| 894,504 A | 7/1908 | Jefferis | |
| 1,488,375 A | 3/1924 | Bowers | |
| 1,967,506 A | 7/1934 | Harrison | 220/6 |
| 2,556,366 A | 6/1951 | Peters et al. | 220/31 |
| 3,348,309 A | 10/1967 | Mellion | 312/109 |
| 3,675,808 A | 7/1972 | Brink | 220/7 |
| 3,819,246 A | 6/1974 | List | 312/257 SK |
| 3,887,101 A | 6/1975 | Adachi | 220/4 F |
| 4,002,287 A * | 1/1977 | Saveth | 229/122.23 |
| 4,098,424 A | 7/1978 | Liebescher et al. | 220/4 F |
| 4,099,293 A | 7/1978 | Pittasch | 16/149 |
| 4,226,348 A | 10/1980 | Dottor et al. | 224/42.42 |
| 4,235,346 A * | 11/1980 | Liggett | 220/7 |
| 4,391,386 A | 7/1983 | Moret | 220/343 |
| 4,447,099 A | 5/1984 | French et al. | 312/257 R |
| 4,615,464 A | 10/1986 | Byrns et al. | 220/469 |
| 4,629,265 A | 12/1986 | Chester | 312/329 |
| 4,887,874 A * | 12/1989 | Joffe | 312/258 |
| 5,320,239 A | 6/1994 | Favre | 220/343 |

(List continued on next page.)

FOREIGN PATENT DOCUMENTS

| EP | 516 961 A1 | 4/1992 |
|---|---|---|
| WO | WO 94/15055 | 7/1994 |

*Primary Examiner*—Ramon O. Ramirez
*Assistant Examiner*—Amy J. Sterling
(74) *Attorney, Agent, or Firm*—Foley & Lardner LLP

(57) ABSTRACT

A method of assembling the storage unit is disclosed. The storage unit includes a unitary sheet of material folded into an enclosure about a plurality of grooves. A cap formed from a unitary sheet of material is mounted above the enclosure and configured to provide usual or physical access to the top of the storage unit. The method comprises applying heat to a groove separating a pair of walls to melt at least a portion of the plastic material, and pivoting the walls so that the surfaces of the groove contact and join as the melted plastic material solidifies.

16 Claims, 12 Drawing Sheets

U.S. PATENT DOCUMENTS

| | | | |
|---|---|---|---|
| 5,372,415 A | 12/1994 | Tisbo et al. | 312/108 |
| D359,402 S | 6/1995 | Tisbo et al. | D6/434 |
| 5,490,604 A | 2/1996 | Alexander | 220/4.34 |
| 5,573,322 A | 11/1996 | Wrobel | 312/400 |
| 5,582,312 A * | 12/1996 | Niles et al. | 220/4.21 |
| 5,595,426 A | 1/1997 | Wolff et al. | 312/109 |
| 5,671,857 A * | 9/1997 | Stromberg | 220/7 |
| 5,673,984 A | 10/1997 | Insalaco et al. | 312/264 |
| 5,704,175 A * | 1/1998 | Lewis | 52/288.1 |
| 5,944,241 A * | 8/1999 | Globig et al. | 224/577 |
| 5,951,126 A | 9/1999 | Wolff et al. | 312/199 |
| 6,053,354 A | 4/2000 | Niemeyer | 220/819 |
| 6,155,444 A * | 12/2000 | Liu | 220/7 |
| 6,494,316 B1 * | 12/2002 | Bloch et al. | 206/45.2 |
| 6,595,605 B1 * | 7/2003 | Babcock et al. | 312/223.2 |
| 2002/0162253 A1 * | 11/2002 | Whang | 40/121 |

\* cited by examiner

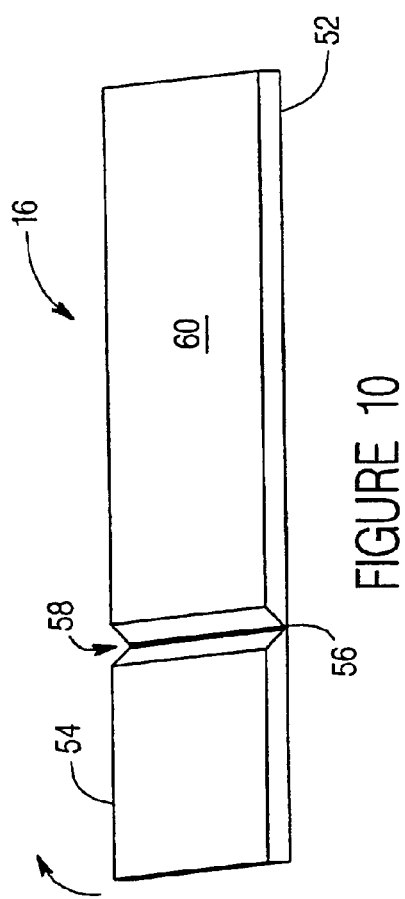
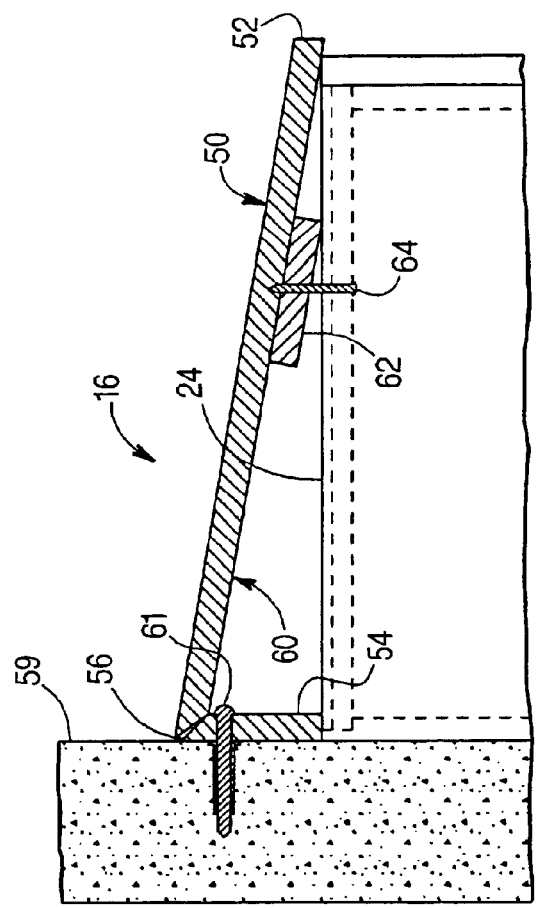

STORAGE UNIT

CROSS-REFERENCE TO RELATED APPLICATIONS

The present invention claims priority under 35 U.S.C. §119 from U.S. Provisional Patent Application No. 60/275,411 titled "STORAGE UNIT" filed Mar. 13, 2001, the full disclosure of which is hereby incorporated herein by reference.

BACKGROUND OF THE INVENTION

The present invention relates to a storage unit. The present invention also relates to a storage unit having a box formed from a one-piece integral sheet.

It is known to provide a storage unit, such as a locker, for use in a workplace, or other institutional, public, government, educational, commercial, or municipal facility such as schools, health clubs, athletic facilities, parks, aquatic centers, military facilities, food processing plants, police departments, recreation centers, theme parks, transportation facilities (e.g., airports, bus stops, train stations, etc.), and the like. Known storage units typically include a door mounted to an enclosure or "box" comprised of side walls, a rear wall, a top, and a bottom metal, and other materials. The box for such known storage units typically is assembled from separate pieces using adhesive, mechanical fasteners, or dovetail joints.

However, such storage units may present disadvantages, such as a large number of parts to assemble, restrictive tolerances or undue precision required for assembly and installation, cost and time burden of assembly, overall configurations that tend to show visual defects or imperfections, the costs of skilled labor, inspection and occasional repair or quality control during and after assembly or installation, and other problems that tend to be associated with assembling and installing such known storage units. For example, aligning and joining adjacent walls (e.g., each at right angles) typically require precision drilling and alignment, multiple fixturing positions, and labor to apply the adhesive or fasteners. Even then, there may be pieces damaged (e.g., split) by the fasteners, adhesive applied to undesired locations, visual defects caused by the fixturing, and the like.

Accordingly, it would be advantageous to provide a less costly storage unit that is of a configuration that is relatively easy to assemble and install. It would also be advantageous to provide a storage unit that is constructed of fewer components and/or fabricated from fewer parts (e.g., integrally molded or machined). It would further be advantageous to provide a storage unit with or providing any one or more of these or other advantageous features.

SUMMARY OF THE INVENTION

The present invention relates to a locker comprising an enclosure having a first panel and a second panel connected to the first panel by a hinge member. The first and second panels and the hinge member are unitarily formed and a door with a latch mechanism releasably coupled to one of the first and second panels.

The present invention also relates to a unitarily formed enclosure for a locker comprising a first wall, a second wall, and a web. The web connects the first wall and the second wall, and has a thickness less than the thickness of the first and second walls. The first wall, second wall, and web are configured to provide a continuous outer and/or inner surfaces without seams at the interface therebetween.

The present invention further relates to a method of assembling a storage unit. The method comprises providing a unitary sheet having a first portion with a first surface and a second portion with a second surface, the first portion being connected to the second portion by a hinge member. The method further comprises joining the first surface to the second surface by applying heat to one of the first surface and the second surface, melting at least a portion of the material at the first or second surface to which heat is applied, and pivoting the first portion relative to the second portion about the hinge until the first surface contacts the second surface.

The present invention further relates to a method of assembling a storage unit comprising providing a sheet of plastic material, and a pair of grooves to the sheet. The grooves may be formed by heat, by milling, during fabrication of the sheet, combinations thereof, or the like. The pair of grooves is configured to separate the sheet into a first portion, a second portion, and a third portion. The method further comprises applying a heating member to one or more surfaces that define the grooves thereby melting some of the plastic material thereon. The method further comprises pivoting the first and third portions so that the surfaces of the grooves contact and join as the melted plastic material solidify.

The present invention further relates to a storage unit comprising an enclosure portion, and a cap including a facing portion and a mounting portion coupled to the panel by a web. The facing portion, mounting portion, and web are unitarily formed. The cap is configured to be mounted above the storage unit to provide an angled surface intended to provide access to items placed on top of the storage unit.

The present invention further relates to a method of installing a storage unit comprising forming an enclosure by providing a unitary sheet having a first portion with a first surface and a second portion with a second surface, the first portion being connected to the second portion by a hinge member, joining the first surface to the second surface by applying heat to one of the first surface and the second surface, and melting at least a portion of the material at the first or second surface which heat is applied to, pivoting the first portion relative to the second portion about the hinge until the first surface contacts the second surface. The method further comprises installing the enclosure, providing a cap having a panel and a mounting interface coupled to the panel by a web, mounting the mounting interface of the cap to a vertical surface above the enclosure, pivoting the panel so that its bottom surface is adjacent the top of the enclosure, and coupling the panel to the top of the enclosure.

DESCRIPTION OF THE FIGURES

FIG. 10 is a perspective view of a cap for a storage unit according to a preferred embodiment.

FIGS. 11 and 12 are side sectional views of the cap being mounted to the storage unit according to a preferred embodiment.

DETAILED DESCRIPTION OF PREFERRED AND OTHER EXEMPLARY EMBODIMENTS

Figure 1:
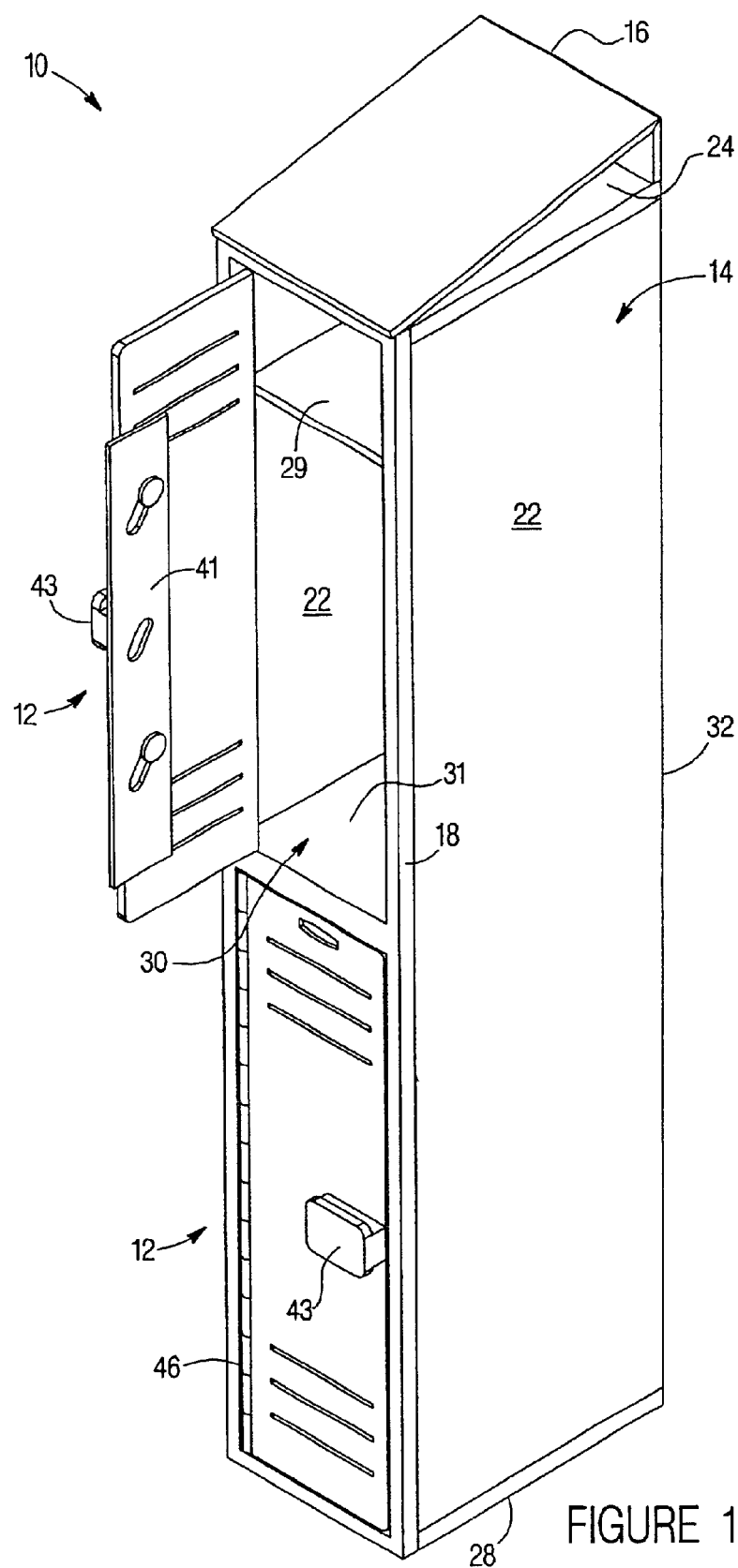
FIG. 1 is a perspective view of a storage unit according to a preferred embodiment.
Figure 2:
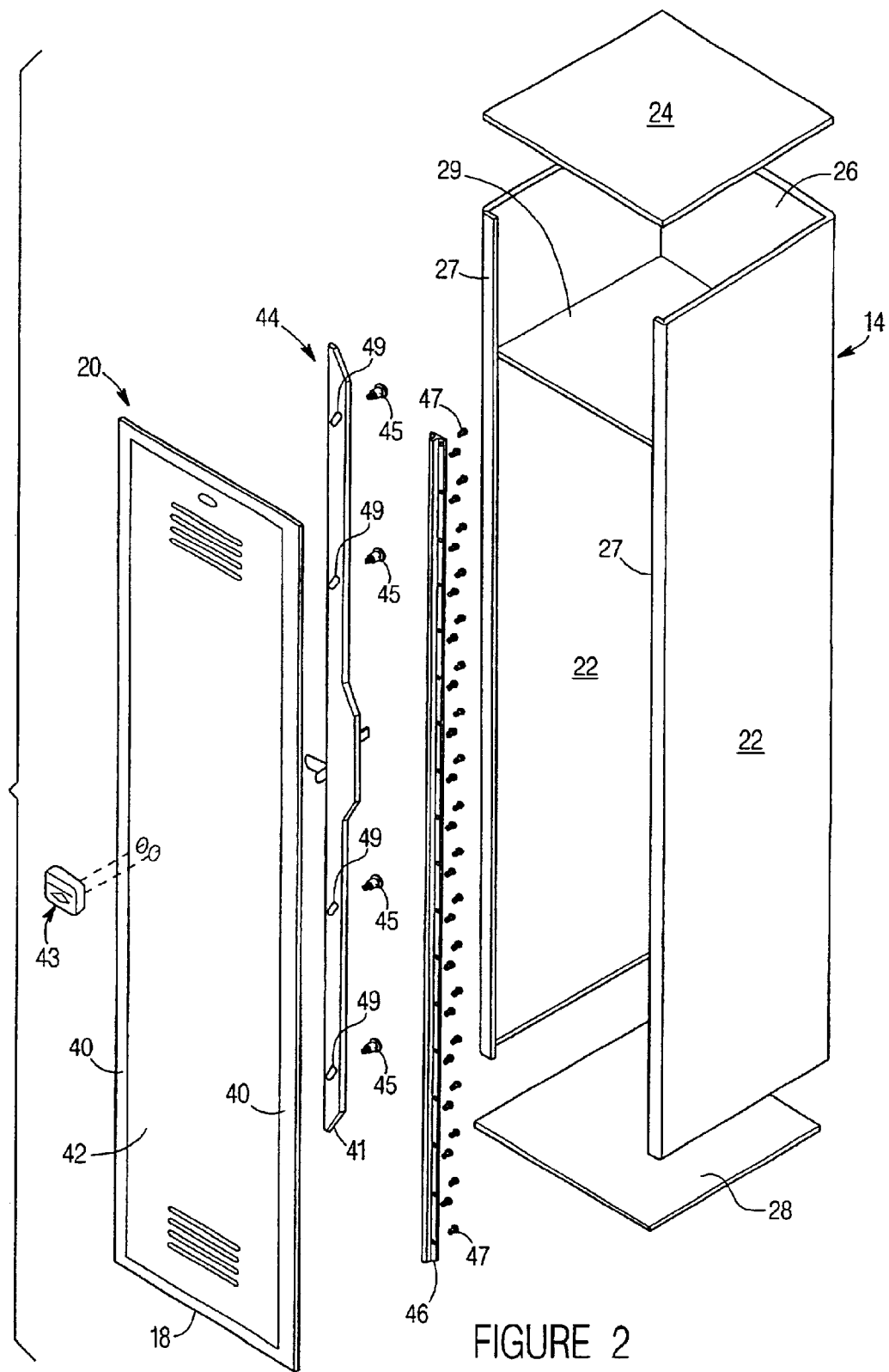
FIG. 2 is an exploded perspective sectional view of the storage unit according to an exemplary embodiment.
Figure 3:
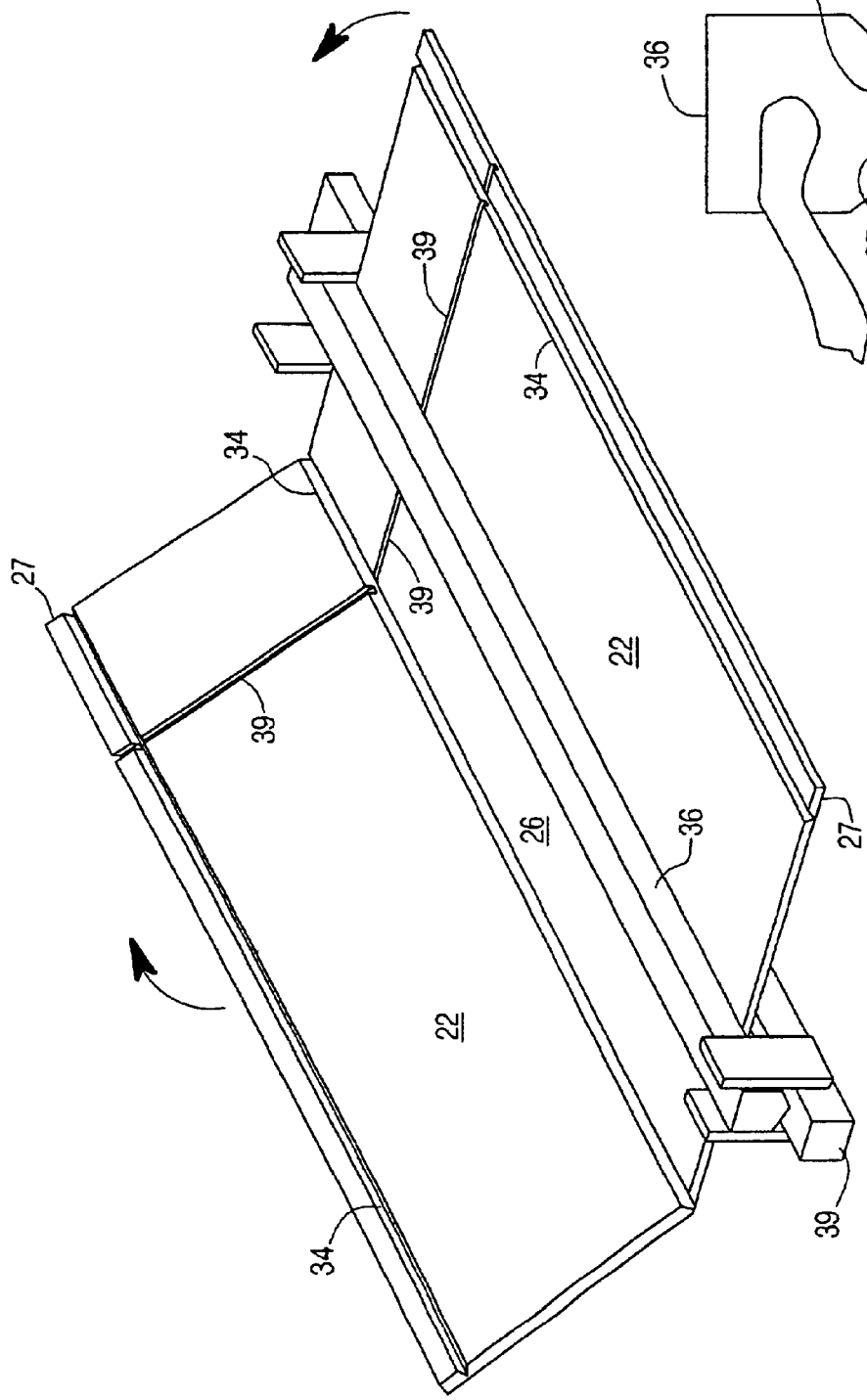
FIG. 3 is a perspective view of a box for a storage unit being heated and folded according to a preferred embodiment.
Figure 4:
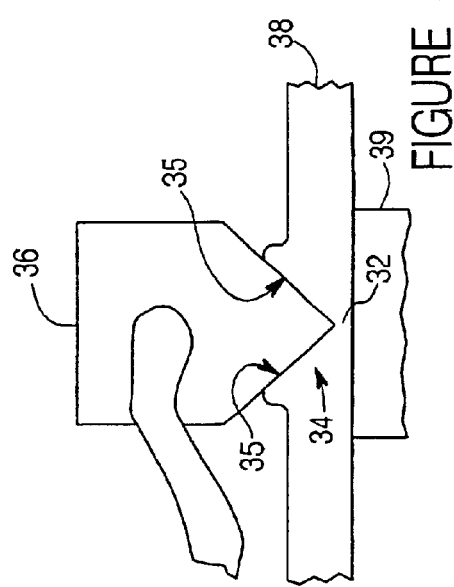
FIG. 4 is a fragmentary side elevation view of the box of FIG. 3.

FIGS. 1 and 2 show a storage unit (shown as a locker system 10 having one or more lockers 12) according to a preferred embodiment. Locker 12 includes a box 14, a cap 16, a frame 18, and a door assembly 20.

Figure 16:
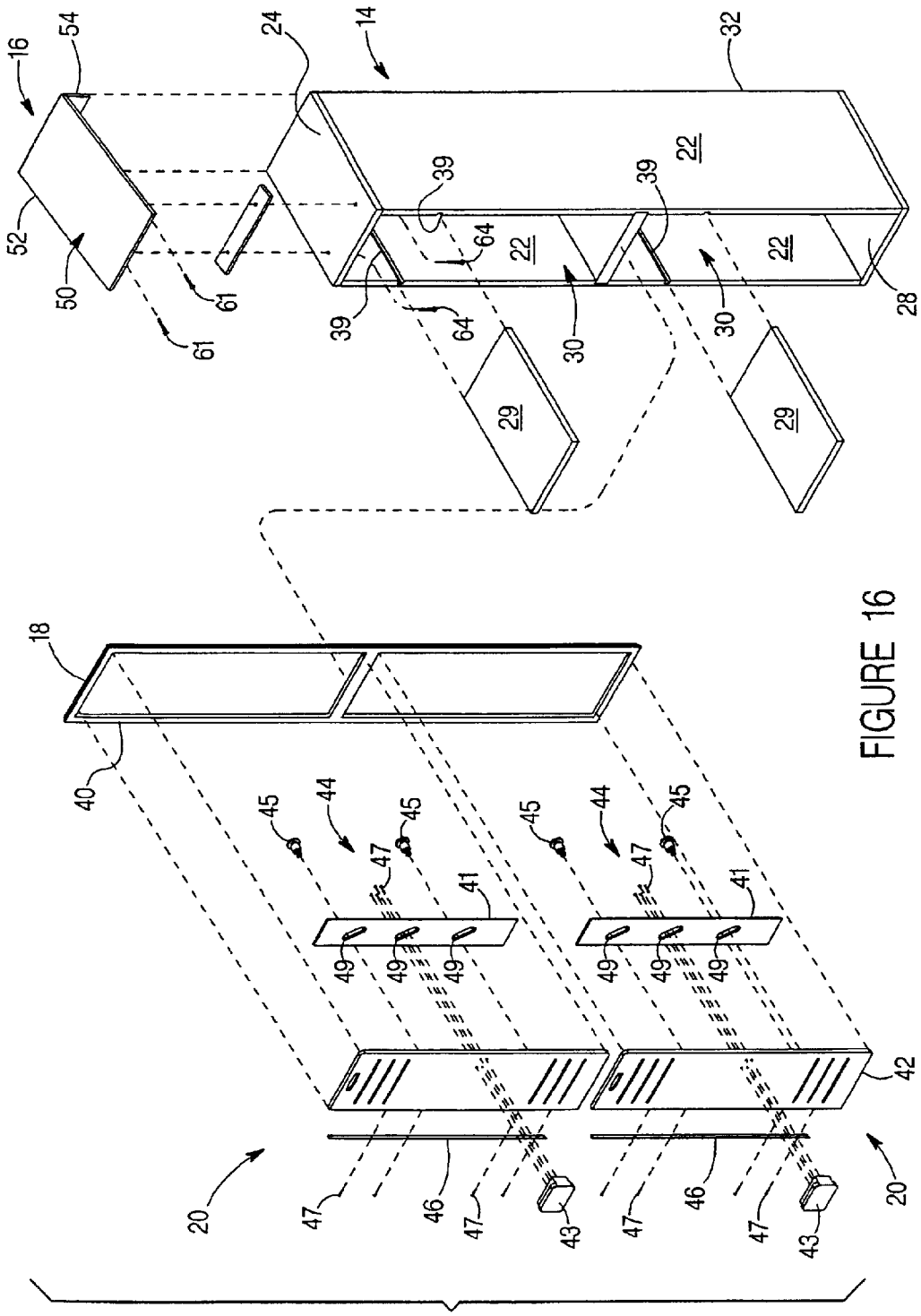
FIG. 16 is an exploded perspective view of a storage unit according to an exemplary embodiment.

Box 14 includes a plurality of walls (shown as a pair of side walls 22, a top wall 24, a rear wall 26, and a bottom wall 28) and a flange 27 that define an interior storage space 30. According to exemplary embodiments, box 14 may have any of a variety of configurations, shapes, sizes, number of walls, etc. (e.g., the box may be made of one or more walls that may provide a rectangular space or a non-rectangular space (e.g., circular, arcuate, ovular, elliptical, cylindrical, etc.). Space 30 may be configured to include one or more shelves 29, hooks, and other accessories or options intended to provide for a variety of storage arrangements. A panel (shown as a divider 31 in FIGS. 1 and 16) may be included to provide multiple lockers 12 for a single box 14.

Figure 14:
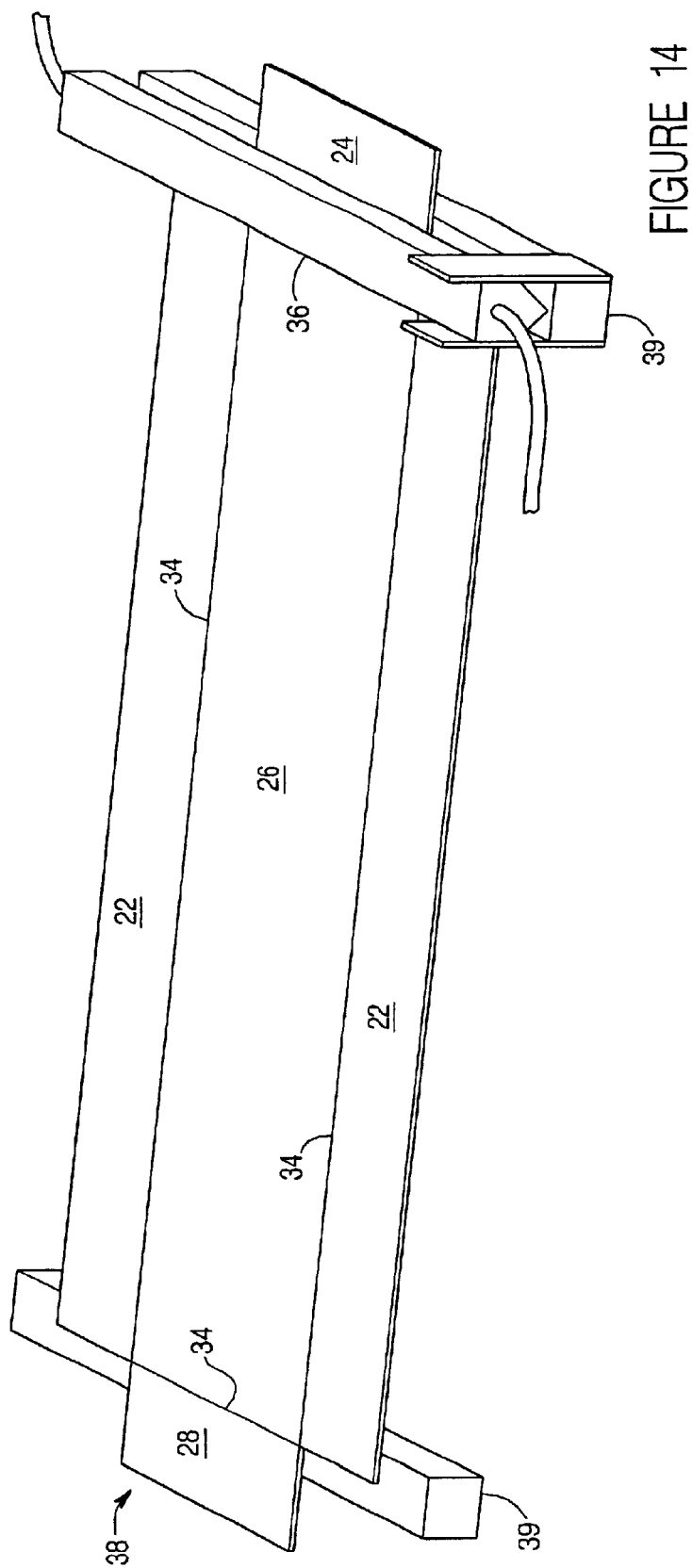
FIG. 14 is a perspective view of a heating member heating surfaces of a groove on a sheet of material to form a box for a storage unit.
Figure 15:
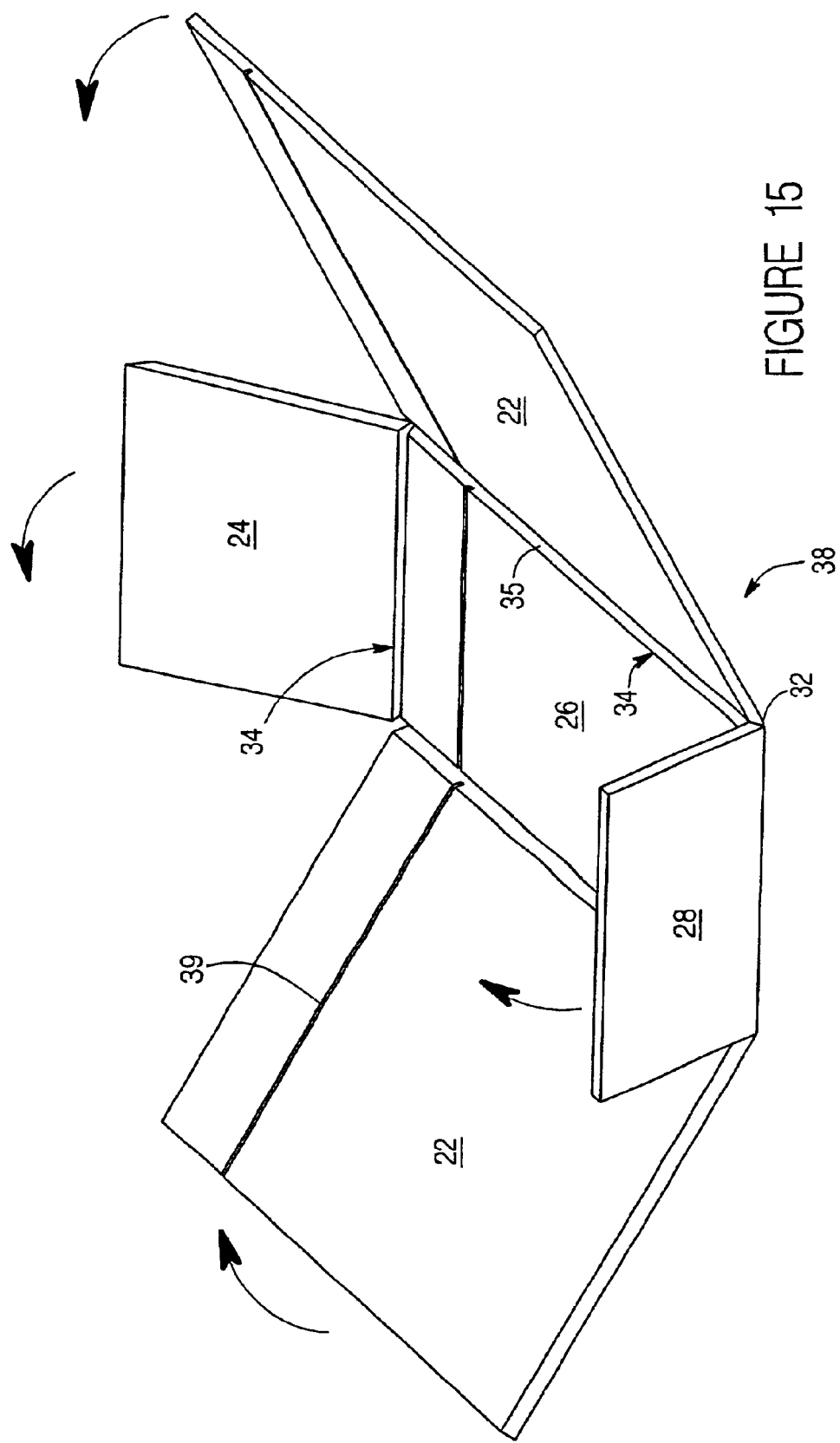
FIG. 15 is a perspective view of a box with a top wall, a bottom wall, and side walls, being folded according to an exemplary embodiment.

According to a preferred embodiment shown in FIGS. 2–5, side walls 22, rear wall 26, and flange 27 of box 14 are integrally (or unitarily) formed from a single piece (e.g., a sheet 38 of material) with the walls being connected by a web 32 (e.g., strip of material or "hinge" or the like). The enclosure is formed by pivoting or folding side walls 22 about web 32 and fixing walls 22, 26 in place. Side walls 22 and rear wall 26 may be fixed or welded in place by melting surfaces 35 of the groove 34 prior to pivoting side walls 22 in place. According to an alternative embodiment shown in FIGS. 14 and 15, the top wall and/or bottom wall are integrally formed with the side walls and rear wall from a single piece and connected by the web. According to an alternative embodiment, the side walls, rear wall, and flange of the box may be fabricated using any of a variety of techniques (e.g., extrusion, casting, various molding processes, deep drawing, etc.).

Figure 5:
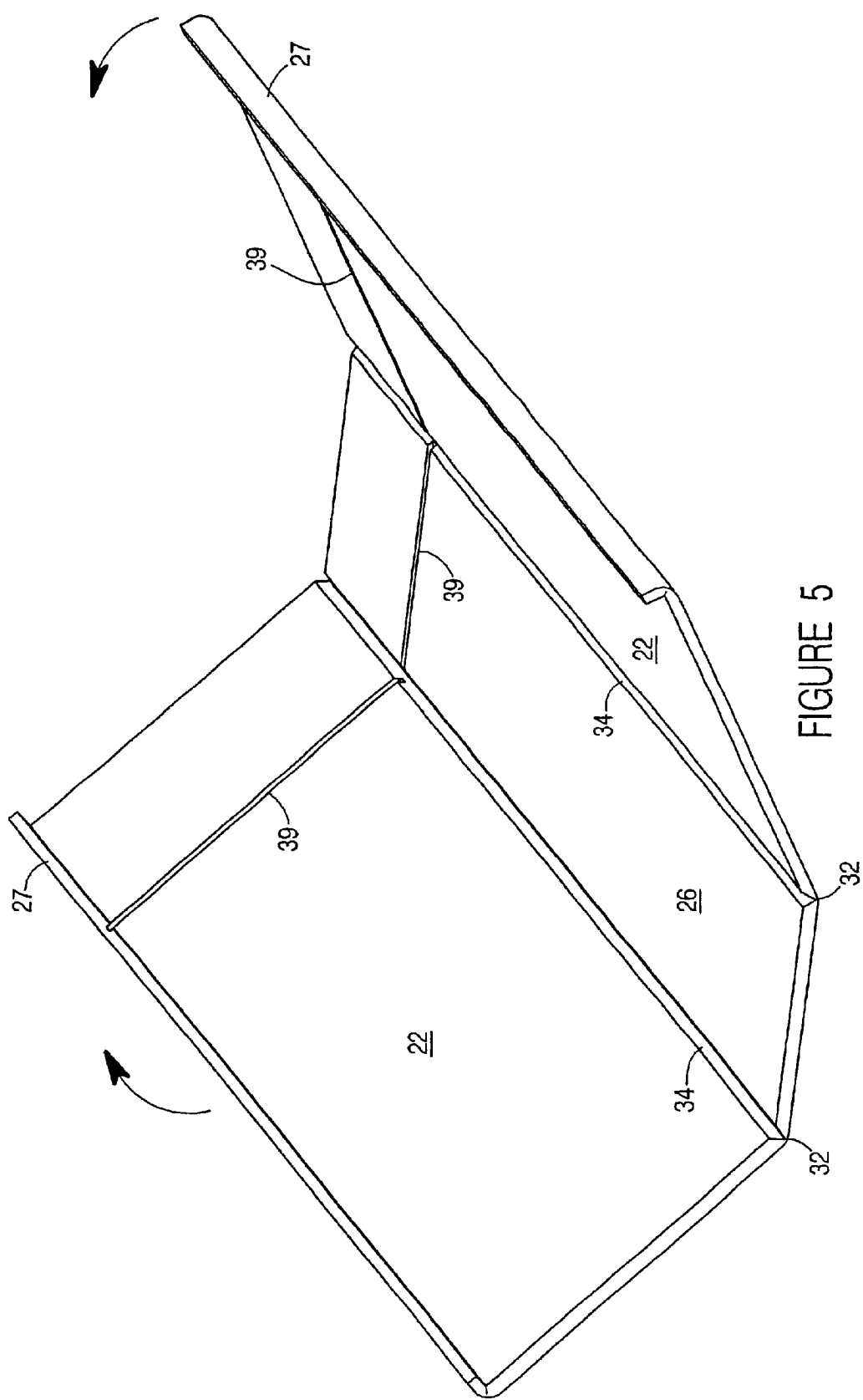
FIG. 5 is a perspective view of the box of FIG. 3 in a partially folded condition.
Figure 6:
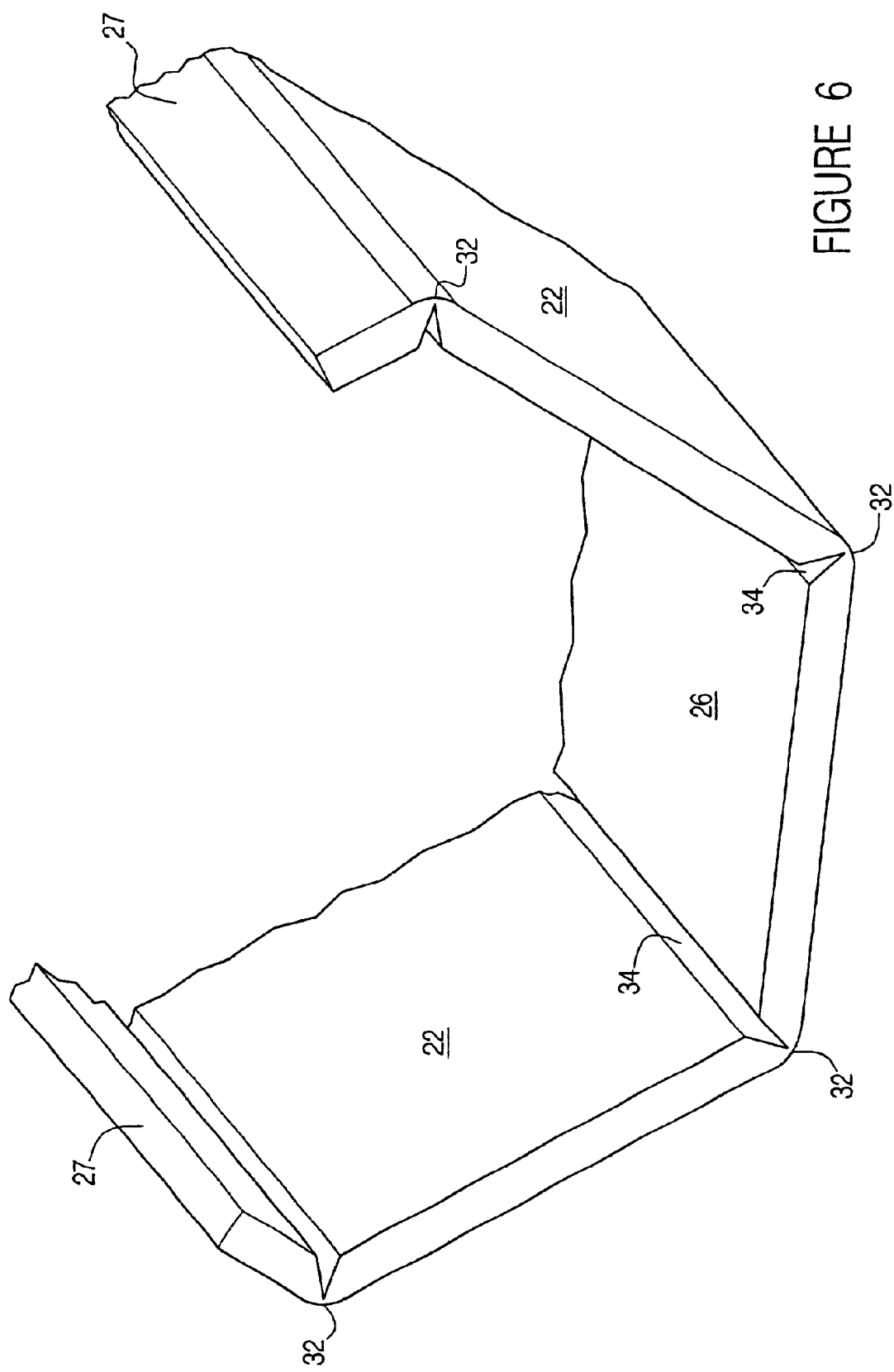
FIG. 6 is a fragmentary perspective view of the box of FIG. 3 in a mostly folded condition.
Figure 9:
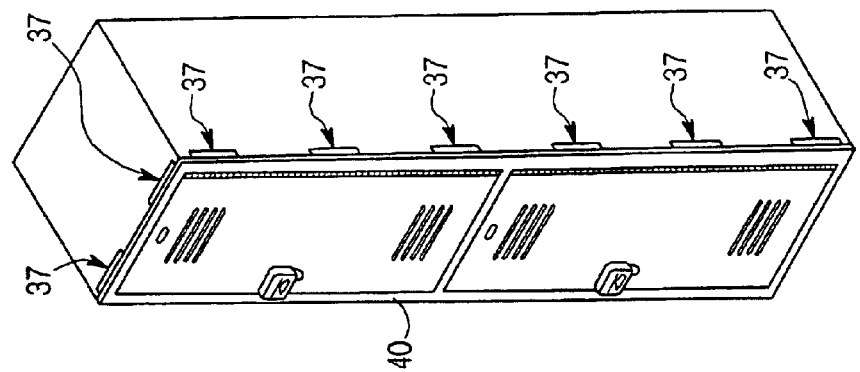
FIG. 9 is a perspective view of storage unit with a door mounted to a frame according to an exemplary embodiment.

Referring to FIG. 5, web 32 is configured to provide a "living hinge" so that side walls 22 and rear wall 26 may be positioned during assembly to provide box 14 and define space 30 (e.g., rotated, pivoted, folded, etc.).

Web 32 may be formed by any of a variety of manufacturing techniques. According to a preferred embodiment, a groove 34 (e.g., a relief notch, slot, etc.) is provided to a sheet 38 (e.g., stock plastic material) to form web 32 to connect the walls and the flange. According to a particularly preferred embodiment, groove 34 is formed by removing material from sheet 38 (e.g., with one or more machining operations). According to an alternative embodiment, the groove may be formed during fabrication of the sheet (e.g., is integrally molded during casting, extrusion injection molding, extruded, etc.) such that the side walls and rear wall are formed or molded as a single piece connected by the web. According to an alternative embodiment, the groove is formed as the heating bar or member contacts the sheet and melts the plastic material. As heating member 36 is contacting surfaces 35 of groove 34, a block 48 may be used to support sheet 38.

Groove 34 may have any of a variety of configurations that allow side walls 22 and rear wall 26 to be moved to the desired position. According to an exemplary embodiment shown in FIGS. 4 and 5, surfaces 35 of groove 34 are angled (e.g., to form a "V"). According to a preferred embodiment, surfaces 35 of groove 34 are angled approximately 90 degrees relative to each other (i.e., for a rectangular or square shaped enclosure). According to alternative embodiments, other angles and configurations of the groove may be employed according to the intended shape or configuration (e.g., between about 30 degrees and about 150 degrees, between about 80 degrees and 100 degrees, an acute angle, an obtuse angle, about 60 degrees for a six-sided unit or some other angles or combination of angles).

Box 14 is assembled by flexing web 32 as flange 27 is pivoted relative to side walls 22, and side walls 22 are rotated or pivoted relative to rear wall 26. Flange 27 and walls 22, 26 of box 14 are then secured in place. According to a preferred embodiment, surfaces 35 of groove 34 are joined (e.g., fused, thermally bonded, adhesively bonded, "welded," etc.). To join surfaces 35 of groove 34, heating bar or member 36 (shown in FIGS. 3 and 4) is contacted to surfaces 35 of groove 34 to melt (or re-melt) at least a portion of the plastic material. Flanges 27 and side walls 22 are then pivoted (shown in FIG. 5) about web 32 so that the molten surface material at surfaces 35 come in contact and are held in place until the molten plastic material solidifies. According to an alternative embodiment, the walls of the box are held in place with adhesives, mechanical fasteners, or the like. Top wall 24 and bottom wall 28 may be secured to box 14 using any of a variety of ways (e.g., fused, joined, bonded, adhesive, welds, mechanical fasteners, etc.). According to a preferred embodiment, top wall 24 and bottom wall 28 are welded to box 14. According to an alternative embodiment, the top wall and/or bottom wall are slid into grooves in the box. According to a particularly preferred embodiment, box 14 is assembled by machining a plurality of grooves 34 to sheet 38 to define top, bottom, side, and rear walls, applying heating member 36 to surfaces 35 of grooves 34, and pivoting each of the walls so that surfaces 35 of the grooves 34 contact and are joined when solidified.

Figure 8:
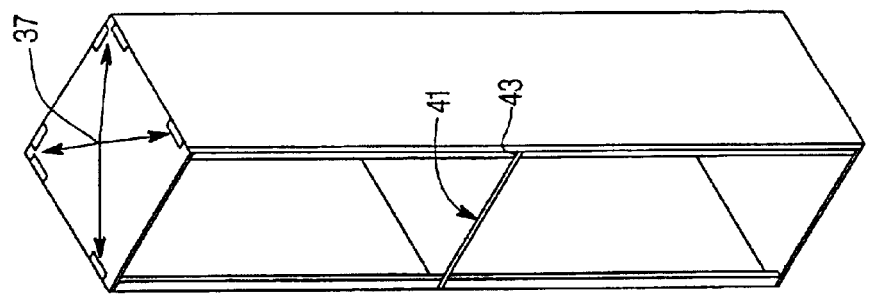
FIGS. 7 and 8 are perspective views of a box for a storage unit according to an exemplary embodiment.
Figure 7:
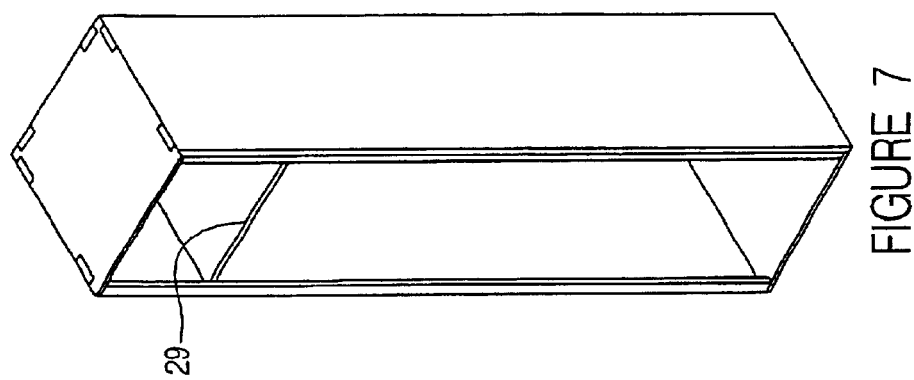
Figure 11:
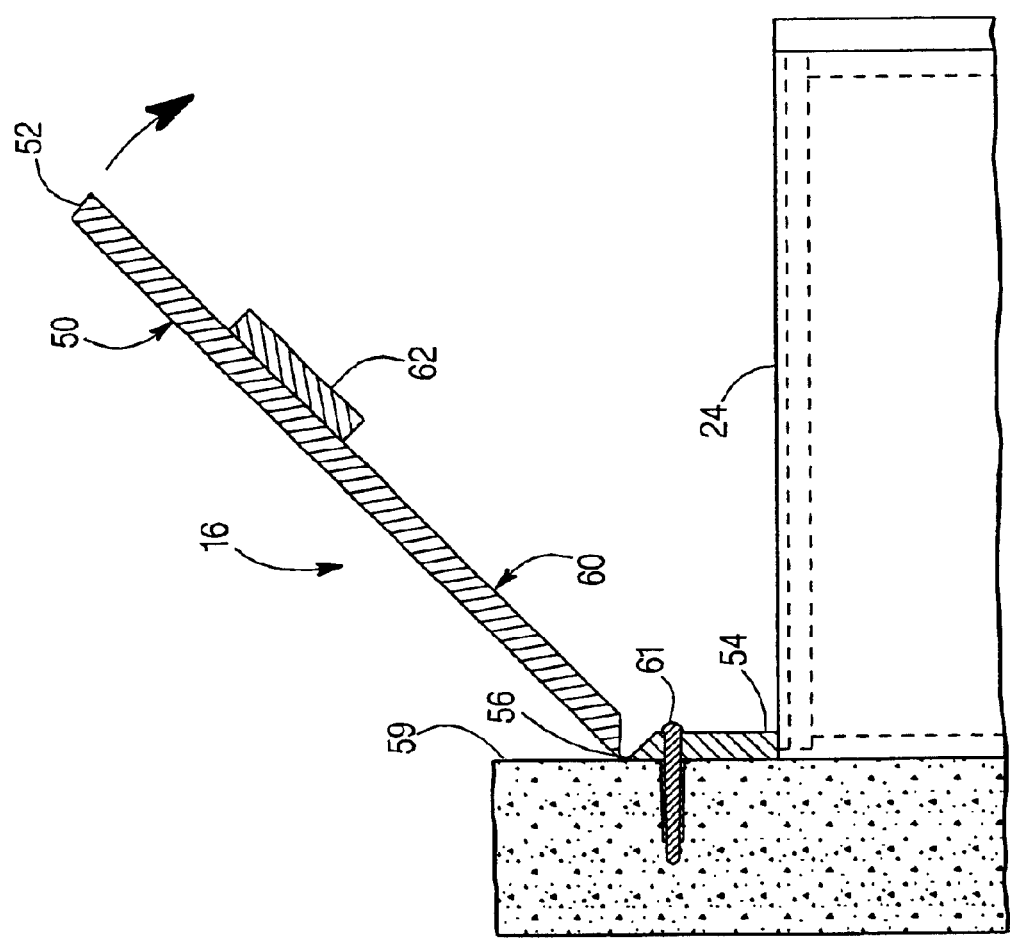
Figure 13:
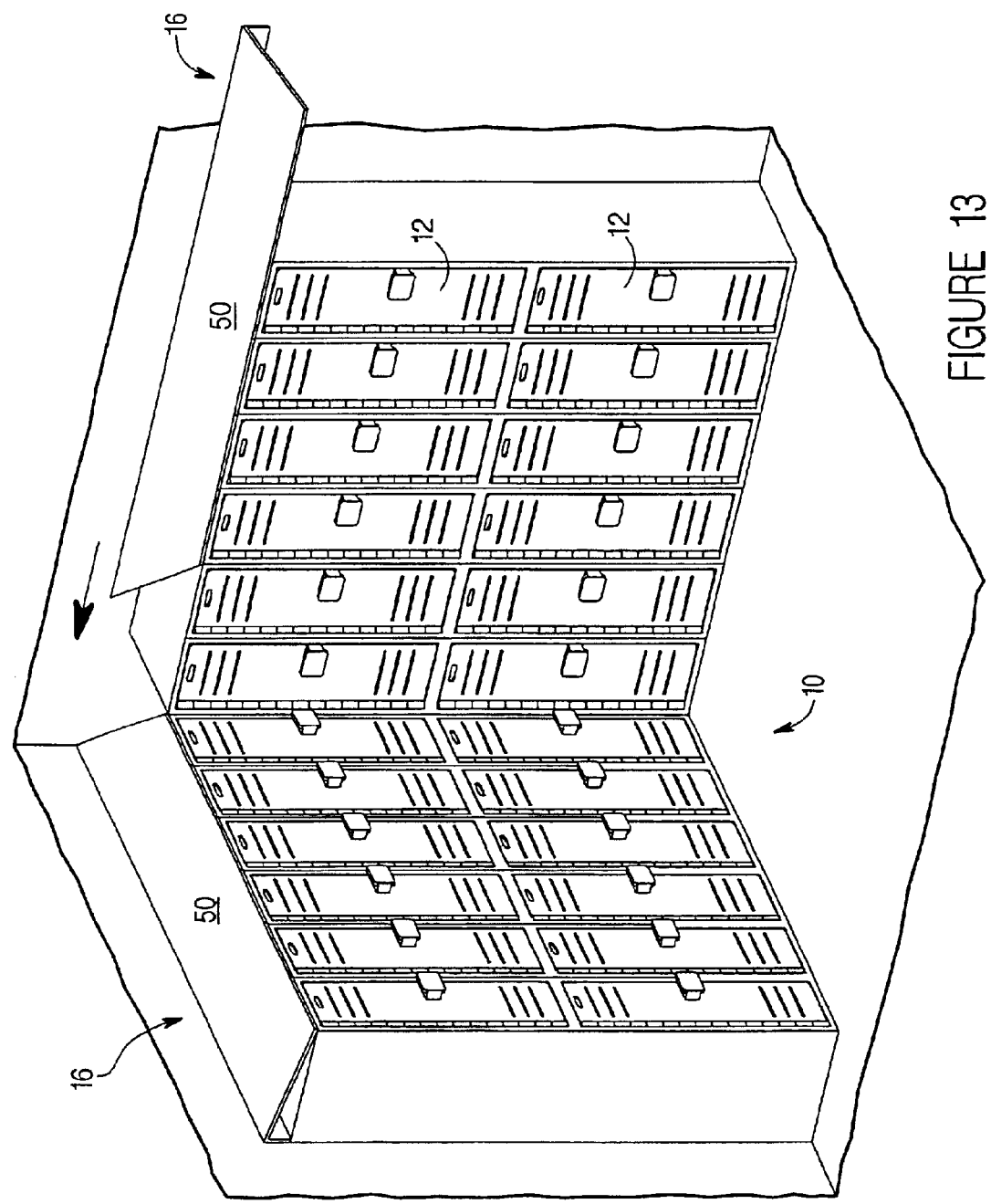
FIG. 13 is a perspective view of a locker system with a cap according to a preferred embodiment.

Shelves 29 are inserted into slots or grooves 39 and held in place by any of a variety of ways (e.g., by frame 18, by an interference fit between shelf 29 and groove 39, adhesive, fasteners, welding, etc. or any combination thereof). According to an exemplary embodiment shown in FIGS. 5 and 7, shelf 29 is located by inserting one side into groove 39 on box 14 at an angle. The other side is pivoted (e.g., slid along the wall) until edges of the shelf are in the slot in rear wall 26 (e.g., "snaps" into place). After positioning shelf in the desired location (i.e., secured in groove 39 in rear wall 26), shelf 29 is secured in place (e.g., with welds, adhesives, mechanical fasteners, etc.). According to an exemplary embodiment shown in FIG. 8, divider 31 may be positioned by inserting (e.g., sliding) through grooves or slots 39 in flanges 27 and into a slot in the walls of box 14. An edge of divider 31 remains substantially flush with front side of box 14 (i.e., flange 27).

According to a particularly preferred embodiment, a plastic weld gun is used to secure the top wall, bottom wall, shelf and/or divider in place with six, two-inch welds on the underside of the shelf starting approximately one inch from the inside corner of the box. The weld gun may be any of a variety of commercially available weld guns configured to melt adjacent material (e.g., with heat) and/or apply a bonding material (e.g., melted plastic, adhesive, etc.). According to an alternative embodiment, the shelves are secured in place before the box is formed.

Referring to FIGS. 1, 2, 8, and 9 frame 18 is secured to flanges 27 and is intended to provide a front surface 40 for locker 12. Frame 18 may be attached using any of a variety of techniques (e.g., dove tail joints, fasteners, adhesive, welded, etc.). According to a particularly preferred embodiment, the bottom and/or other sides of the frame and the box provide a flush surface. According to a preferred embodiment, frame 18 and box 14 are joined (e.g., welded, fused, bonded, etc.). According to a particularly preferred embodiment, a plastic weld gun is used to secure the frame in place with two, four-inch welds 37 on the top and bottom, and near the underside of the divider starting approximately one inch from the inside corner. Additionally, five or six four-inch welds 37 may be applied along the vertical interface, welding the side with the latch bar first, starting from the inside corner and at equal spacing. According to an alternative embodiment, the frame is attached to the side walls using any of a variety of methods (e.g., mechanical fasteners, etc.).

Assembly of box 14 may be done by the manufacture or "on site" installation of locker 12. According to a preferred embodiment, box 14 is assembled by the manufacturer along with other components of locker 12 or locker system 10. According to an alternative embodiment, the locker is assembled during or just prior to installation. When assembled by the installer, components of lockers 12 may be shipped in a "knocked-down" mode (i.e., flat), which is intended to improve handling and reduce shipping costs. The walls of box 14 may be provided with pre-drilled fastener holes intended to improve assembly and/or installation (e.g., cost, time, etc.). According to an exemplary embodiment, locker system 10 is configured as a modular unit, which is intended to increase installation and assembly options and improve installation procedures. As a modular unit, it is intended to provide flexibility in selecting a variety of configurations.

Referring to FIG. 2, door assembly 20 includes a door 42 and a latch assembly 44. Door 42 includes one or more apertures (shown as slot). According to a preferred embodiment, door 42 is attached to frame 18 with one or more hinges 46. Hinges 46 may be any of a variety of hinge arrangements configured to couple door 42 to frame 18. Hinge 46 is mounted to door 42 and frame 18 by a plurality of fasteners 47. According to an alternative embodiment, the door is coupled directly to the side wall 22. Latch assembly 44 is configured to engage frame 18 to secure door 42 in a closed position and to disengage from frame 18 so that door 42 may be opened. Latch assembly includes a latch bar 41 and a handle assembly 43. Latch bar 41 is mounted on pins 45 that slidably engage slots 49. Latch bar 41 is coupled to handle assembly by fasteners 47.

Referring to FIGS. 1 and 10–13, cap 16 provides an angled surface 50 that is intended to inhibit placement of items above locker 12 and/or provide access (e.g., actual and/or physical) to items placed on top of locker 12. Cap 16 includes a panel 52 and a mounting interface 54 connected to panel by a web 56. According to a preferred embodiment, cap 16 is integrally formed from a one-piece (e.g., sheet) of material.

The web of the cap may be provided by any of a variety of manufacturing, molding, and/or fabrication methods which provide a groove 58 (e.g., a relief notch, a "V-groove," etc.) between the panel and the mounting interface. According to a preferred embodiment, a groove 58 is provided by a machining operation that removes material from a sheet of "stock" material. According to an alternative embodiment, the groove may have any of a variety shapes and configurations which provide a relief space so that the panel and mounting interface may be rotated or pivoted (folded) about the web. According to an alternative embodiment, the groove may be integrally molded into the cap.

According to an exemplary embodiment, cap 16 for a storage unit includes panel 52 and mounting interface 54 coupled to panel 52 by web 56. Cap 16 is configured to be mounted above the storage unit to provide angled surface 50. Mounting interface 54 may be mounted to a vertical surface so that panel 52 may be pivoted into place and coupled to the storage unit.

According to an exemplary embodiment, a method of installing cap 16 for a storage unit includes providing cap 16 having panel 52 and mounting interface 54 coupled to panel 52 by web 56, mounting interface 54 of cap 16 to a vertical surface, pivoting panel 52 so that its bottom surface is adjacent the top of the storage unit, and coupling panel 52 to the top of the surface.

During assembly of locker system 10, after lockers 12 are mounted to a vertical surface 59 (e.g., by fasteners 61, adhesive, wall anchors, etc.), mounting interface 54 of cap 16 is mounted to the vertical surface (e.g., with fasteners, stakes, adhesive, etc.). According to an alternative embodiment, the cap is mounted to the locker (e.g., the mounting interface may be connected to the top wall and/or near wall of the box, or the like). Panel 52 is then rotated (e.g., lowered) about web 56 until a bottom surface 60 of panel 52 rests on locker 12. According to a preferred embodiment, a support member 62 is provided on bottom surface 60 of panel 52. Cap 16 may be shipped in a "knocked-down" mode (i.e., flat), which is intended to improve handling and reduce shipping costs.

Support member 62 may be integrally molded with panel 52 or attached to bottom surface 60 as a separate piece with any of a variety of techniques (e.g., fasteners, adhesive, welding, etc.). With panel 52 in a lowered position, fasteners 64 may be used to attach panel 52 to top wall 24 of locker 12. According to a preferred embodiment, top wall 24 of locker 12 is connected to support member 62 by a plurality of fasteners 64.

The lockers may be provided with any of a variety of additional components, including key locks, built in combination locks, coin operated locks, end panels, solid plastic bases, mesh doors, drawers, bins, engraved logos, number plates, hooks, drawers, trim, and the like.

It is important to note that the terms "storage unit," "locker system," and "locker" are intended to be a broad term and not a term of limitation. While the components of the disclosed embodiments will be illustrated as a locker or locker system, the features of the disclosed embodiments have a much wider applicability. For example, the design is adaptable for other storage units, enclosures, bins, containers, and other office, home, or educational products that employ a storage space configured to rotate relative to a base. Further, the size of the various components and the size of the containers can be widely varied.

According to a particularly preferred embodiment, the top wall, bottom wall, frame, and/or door are made from high density polyethylene ("HDPE"). According to an alternative embodiment, any of a variety of plastic materials may be used (e.g., polypropylene, other types of polyethylene, acrylonitrile butadiene styrene ("ABS"), nylon, acrylics, any of a variety of homopolymer plastics, copolymer plastics, plastics with special additives, filled or unfilled, reinforced or non-reinforced, etc. According to an alternative embodiment, other materials (e.g., metal, plastic, etc.) may be used.

According to a particularly preferred embodiment, the cap is made from high density polyethylene ("HDPE"). According to an alternative embodiment, the box may be made from any of a variety of plastic materials (e.g., polypropylene, polyethylene, acrylonitrile butadiene styrene ("ABS"), nylon, acrylics, any of a variety of homopolymer plastics, copolymer plastics, plastics with special additives, filled or unfilled, reinforced or non-reinforced, etc.) According to an alternative embodiment, the cap may be made from any of a variety of materials (e.g., metal, plastic, etc.).

According to a particularly preferred embodiment, the heating bar is commercially available as a "Model SS-8 8-foot Bending Sword Set" from Abbeon Cal, Inc. of Santa Barbara, Calif.

It is also important to note that the construction and arrangement of the elements of the storage unit as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, any of a variety of methods can be used to melt the plastic material at the surfaces of the grooves (e.g., heating elements, chemicals, ultrasonic, etc.). Also, the enclosure can be configured for a variety of sizes and shapes (having a variety of sides, curvatures, and the like). Further, the inventions described herein can be used to form an enclosure that is then configured as several locker units. Further, the grooves shown in the cap and in the disclosure may have any of a variety of shapes or configurations (e.g., V-shaped, curved, square, etc.). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A storage enclosure comprising:
    an enclosure having:
        a first panel including a first surface; and
        a second panel including a second surface and coupled to the first panel by a first web and a first thermal bond between the first surface and the second surface and proximate the first web;
    wherein the first panel, the second panel, and the first web are unitarily formed.

2. The storage enclosure of claim 1 further comprising a third panel including a third surface and coupled to the second panel by a second web and a second thermal bond between the third surface and a fourth surface on the second panel, wherein the first panel, the second panel, the third panel, the first web, and the second web are unitarily formed.

3. The storage enclosure of claim 2 wherein the first and second surfaces are joined by melting a portion of the first and second surface.

4. The storage enclosure of claim 1 wherein the enclosure is formed by a unitary sheet folded about a plurality of grooves.

5. The storage enclosure of claim 1 wherein the web is a living hinge.

6. A unitarily formed enclosure for a locker, the enclosure comprising:
    a first wall;
    a second wall;
    a third wall;
    a first hinge member and a first thermal bond coupling the first wall and the second wall, the first hinge member having a thickness less than the thickness of the first and second walls;
    a second hinge member and a second thermal bond coupling the second wall and the third wall, the second hinge member having a thickness less than the thickness of the second wall and the third wall;
    wherein the first wall, the second wall, the third wall, the first hinge member, and the second hinge member provide a continuous surface without seams at the interface therebetween.

7. The enclosure of claim 6, further including a joint between the first and second wall.

8. The enclosure of claim 7 wherein the first panel includes a first surface and the second panel includes a second surface joined to the first surface by the first thermal bond.

9. The enclosure of claim 8 wherein the first surface and second surface are bonded by melting a portion of the first surface and second surface.

10. The enclosure of claim 8 wherein the first wall, second wall, first hinge member, and second hinge member are formed from a single sheet of plastic material.

11. The storage enclosure of claim 6 wherein the enclosure is formed by pivoting the first and second panels about the hinge member and fixing the walls in place.

12. A locker comprising:
    an enclosure formed from a single sheet, the enclosure including a first wall, a second wall, and a third wall, wherein the first wall is coupled to the second wall by a first web and a first thermal bond, and the second wall is coupled to the third wall by a second web and a second thermal bond;
    a cap including a facing portion and a mounting portion coupled to the facing portion by a web, wherein the facing portion, mounting portion, and web are unitarily formed;
    wherein the cap is positioned above the enclosure so that the facing portion provides an angled surface intended to inhibit placement of items on top of the cap.

13. The storage unit of claim 12 wherein the mounting portion is mounted to a vertical surface so that the panel is pivoted into place and coupled to the storage unit.

14. The storage enclosure of claim 12 wherein the facing portion is angled to inhibit placement of items above the storage unit.

15. The storage enclosure of claim 12 wherein the cap is configured to provide visual and physical access to a top portion of the storage unit.

16. A locker comprising:
    an enclosure including:
        a first panel having a first surface;
        a second panel having a second surface and a third surface and coupled to the first panel by a first web and a first thermal bond between the first surface and the second surface and proximate the first web;
        a third panel including a fourth surface and coupled to the second panel by a second web and a second thermal bond between the third surface and the fourth surface;
    a door coupled to the enclosure;
    wherein the first panel, the second panel, the third panel, the first web, and the second web are unitarily formed.

* * * * *